United States Patent [19]
Schirmer et al.

[11] Patent Number: 5,755,816
[45] Date of Patent: May 26, 1998

[54] TILT CARRIAGE

[75] Inventors: Michael Schirmer, Orono; Denis Gleason, Oshawa, both of Canada

[73] Assignee: Kelley Atlantic Ltd., Ontario, Canada

[21] Appl. No.: 670,233

[22] Filed: Jun. 21, 1996

[51] Int. Cl.⁶ .................................................. B25J 11/00
[52] U.S. Cl. .................... 414/768; 414/782; 414/784; 248/143; 248/145.6; 211/169.1
[58] Field of Search .............................. 414/425, 754, 414/758, 768, 769, 772, 782, 784; 248/130, 133, 139, 140, 143, 145.6; 211/144, 169.1, 161, 131

[56] References Cited

U.S. PATENT DOCUMENTS

| | | | |
|---|---|---|---|
| 722,296 | 3/1903 | Gassard | 414/754 |
| 1,029,365 | 6/1912 | Hazard . | |
| 1,224,963 | 5/1917 | Sauer . | |
| 1,705,580 | 3/1929 | Marburger . | |
| 2,260,695 | 10/1941 | Self | 45/83 |
| 2,264,419 | 12/1941 | Unger et al. . | |
| 2,539,700 | 1/1951 | Pieper | 311/36 |
| 2,903,219 | 9/1959 | Ingham, Jr. | 248/137 |
| 3,075,652 | 1/1963 | McCoy | 414/784 |
| 3,138,273 | 6/1964 | Gray | 414/754 |
| 3,235,212 | 2/1966 | Baumiller, Jr. | 248/142 |
| 3,294,266 | 12/1966 | Snow | 248/133 |
| 3,362,673 | 1/1968 | Patch | 248/133 |
| 3,536,283 | 10/1970 | Lowe | 248/129 |
| 3,750,810 | 8/1973 | Stanfill | 414/754 |
| 3,753,505 | 8/1973 | Ouska | 414/784 |
| 3,777,920 | 12/1973 | Wiese . | |
| 4,315,711 | 2/1982 | Koscho | 414/754 |
| 4,524,680 | 6/1985 | Jeanrat et al. | 414/782 |
| 4,669,694 | 6/1987 | Malick | 248/130 |
| 5,037,047 | 8/1991 | Chanko | 248/140 |
| 5,074,513 | 12/1991 | Presley et al. | 248/130 |
| 5,150,627 | 9/1992 | Lindsay | 74/98 |
| 5,400,720 | 3/1995 | Stevens | 108/147 |
| 5,431,112 | 7/1995 | Thompson | 108/7 |
| 5,538,389 | 7/1996 | Stone | 414/754 |

*Primary Examiner*—Karen B. Merritt
*Assistant Examiner*—Douglas Hess
*Attorney, Agent, or Firm*—Michael, Best & Friedrich

[57] ABSTRACT

A tilt carriage assembly including a base frame and a carriage pivotally supported by the base frame. The carriage includes a bottom member adapted to support a container and a back member positioned above the bottom member. A manual locking mechanism is operatively positioned between the carriage and the base frame, and includes a lock control member positioned adjacent the back member. The lock control member is movable between a locked position where the carriage is secured relative to the base frame and an unlocked position. A step member is secured to and extends laterally outwardly from the carriage, the step member being engageable by a user's foot to facilitate tilting of the carriage. A side member is positioned above at least one of the side portions of the bottom member, and includes a beveled edge that facilitates loading a container onto the carriage. A conveyor device is secured to the bottom member for facilitating motion of a container relative to the bottom member.

19 Claims, 6 Drawing Sheets

TILT CARRIAGE

FIELD OF THE INVENTION

The present invention generally relates to the field of material handling devices, and more specifically to the field of tilt carriages that facilitate tilting of containers loaded with products.

BACKGROUND OF THE INVENTION

The movement of heavy and/or oversized loads in an industrial setting has traditionally, in some situations, been performed manually. Such manual movement can be difficult on the individual due to the massive weight and/or large size of such loads.

In some industrial settings, it is common to load products into a container (e.g., bin) for transport to another location. For example, castings or stampings can be loaded into a bin between production operations. To facilitate loading and unloading, it is helpful to tilt the bin. Due to the heavy weight associated with many bins, such tilting is commonly performed utilizing automated tilt carriages powered by hydraulic, pneumatic or electrical means.

The use of automated tilt carriages provides an adequate means for tilting storage bins while alleviating the stress on the individual. However, such tilt carriages tend to be relatively expensive, thereby limiting their use to some extent.

SUMMARY OF THE INVENTION

The present invention attempts to improve on the prior art by providing a tilt carriage assembly for use in supporting a container and for tilting the container between selected tilt positions. The tilt carriage assembly is designed to be tiltable with little exertion on the part of the individual. The tilt table of the present invention is also designed to be lockable at several different angular positions. The present invention also attempts to facilitate easy loading of a container onto the carriage.

The tilt carriage assembly generally includes a base frame and a carriage pivotally supported by the base frame. The carriage includes a bottom member adapted to support a container and a back member positioned above the bottom member, the back member being adapted to support a side of a container when the carriage is tilted.

In one aspect, the tilt carriage assembly further includes a manual locking mechanism operatively positioned between the carriage and the base frame. The locking mechanism includes a lock control member positioned adjacent the back member, the lock control member being movable between a locked position where the carriage is secured relative to the base frame and an unlocked position. Preferably, the lock control member includes a lock handle that moves down when the lock control member moves from the locked position to the unlocked position. In addition, it is preferred that the lock control member is pivotally connected to an upper portion of the back member. In one embodiment, the manual locking mechanism further includes a lock bar operatively connected to the lock control member and pivotally connected to the carriage, and a multi-position locking device operatively positioned between the lock bar and the carriage. For example, the locking device can include at least one finger member connected to one of the lock bar and the carriage, and at least one recess connected to the other of the lock bar and the carriage, wherein the finger can selectively engage the recess.

In a second aspect, the carriage is tiltable in a forward rotational direction from a generally non-tilted position to a tilted position. In this aspect, the tilt carriage assembly further includes a manual locking mechanism operatively positioned between the carriage and the base frame, the locking mechanism being movable between a locked position where the carriage is secured relative to the base frame and an unlocked position. The locking mechanism includes a lock handle that moves substantially in the first direction when the locking mechanism moves from the locked position to the unlocked position. Preferably, the carriage includes a tilt handle positioned adjacent the lock handle, and the lock handle moves away from the tilt handle when the locking mechanism moves from the locked position to the unlocked position.

In a third aspect, the tilt carriage assembly further includes a step member (e.g., an L-shaped rail) secured to and extending laterally outwardly from the carriage, the step member being engageable by a user's foot to facilitate tilting of the carriage. Preferably, the step member extends laterally outwardly from a lower portion of the tilt carriage. Further, it is preferred that the step member be positioned such that the step member moves down as the carriage is tilted from a level position to a tilted position.

In a fourth aspect, the carriage bottom member includes a front portion, two side portions and a back portion. The carriage further includes a side member positioned above at least one of the side portions of the bottom member, and the side member includes a beveled edge that facilitates loading a container onto the carriage. Preferably, the carriage includes a side member positioned above each of the side portions, and each of the side members includes a beveled edge. The beveled leading edges are preferably formed on an inner front edge of the side portions.

In a fifth aspect, the carriage includes a conveyor device secured to the bottom member for facilitating motion of a container relative to the bottom member. For example, the conveyor device could include a plurality of rollers or any other suitable device for facilitating loading of a container onto the carriage.

3

DETAILED DESCRIPTION

One embodiment of the present invention is illustrated in FIGS. 1–5. The illustrated tilt carriage assembly 20 includes a base frame 22 and a carriage 24 pivotally supported by the base frame 22. The carriage 24 can be pivoted from a generally non-tilted position (solid line in FIG. 4) to a plurality of tilted positions (broken lines in FIG. 4). A manual locking mechanism 26 is used to selectively lock the position of the carriage 24 at selected tilt positions.

Figure 5:
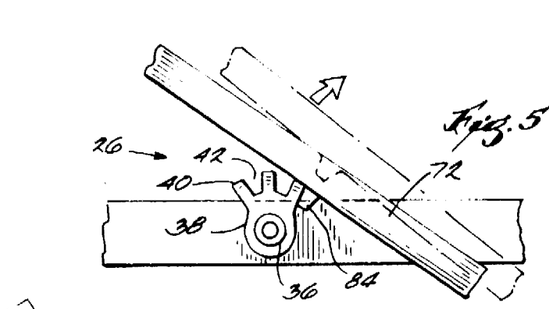
FIG. 5 is an enlarged side elevation view of the locking mechanism of the tilt carriage shown in FIGS. 1–4.

The illustrated base frame 22 includes two substantially triangular-shaped support members 28 interconnected by a support tube 30 and a rear base angle 32. Two front base angles 34 provide a means for securing the base frame to the floor utilizing, for example, bolts or other appropriate fastening means. A bearing housing 36 is secured to the inner surface (i.e., the surfaces facing inwardly toward each other) of each support member 28. A lock retainer 38 is secured to the inner surface of one of the support members 28 (FIG. 5). The illustrated lock retainer 38 includes three radially-projecting tab members 40 defining a series of recesses 42 that are circumferentially spaced around the bearing housing 36.

The illustrated carriage 24 includes a bottom member in the form of a substantially rectangular platform 44. The illustrated platform 44 is made by securing a rectangular plate 46 over a tubular support structure (not shown). The platform 44 includes a front edge 48, two side edges 50 and a back edge 52. A back member in the form of a back tubular structure 54 extends upwardly from the back edge 52 of the platform 44. The back tubular structure 54 is formed by two vertical back tubes 56 and a horizontal back tube 58 welded to the two back tubes 56 as illustrated. In a preferred embodiment, the three back tubes 56, 58 are each formed from 2"×3"×⅛" High Strength Steel ("HSS").

The carriage 24 further includes two side members in the form of two side tubular structures 60 extending upwardly from the side edges 50 of the platform 44 and welded to the back tubular structure 54. Each side tubular structure 60 includes three horizontal side tubes 62 and three vertical side tubes 64 welded together in the illustrated configuration. In a preferred embodiment, each of the side tubes 62, 64 is made from 2"×3"×⅛" HSS.

Figure 1:
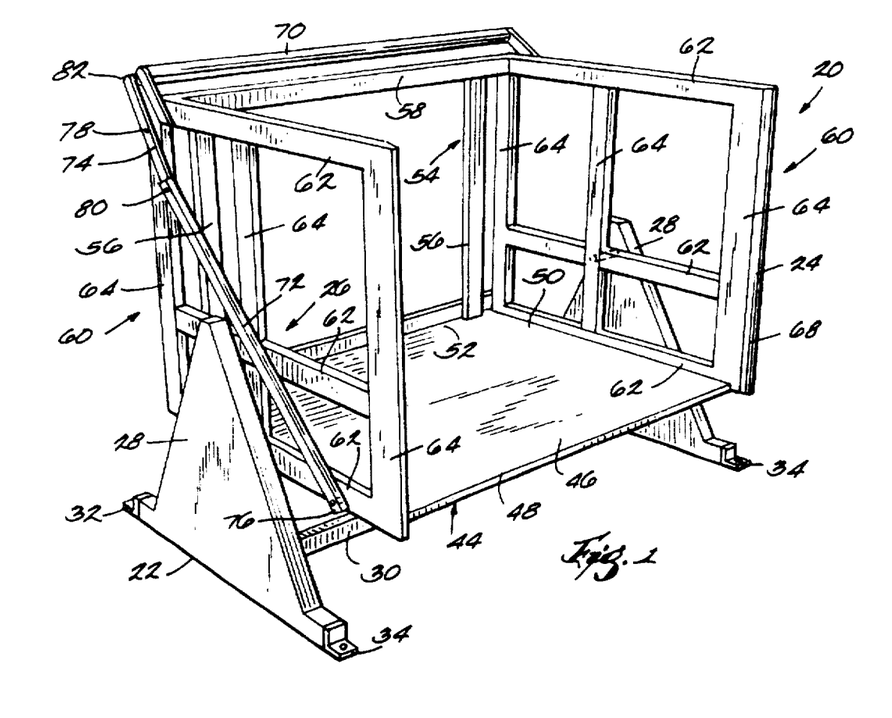
FIG. 1 is a perspective view of a tilt carriage depicting one embodiment of the present invention.
Figure 2:
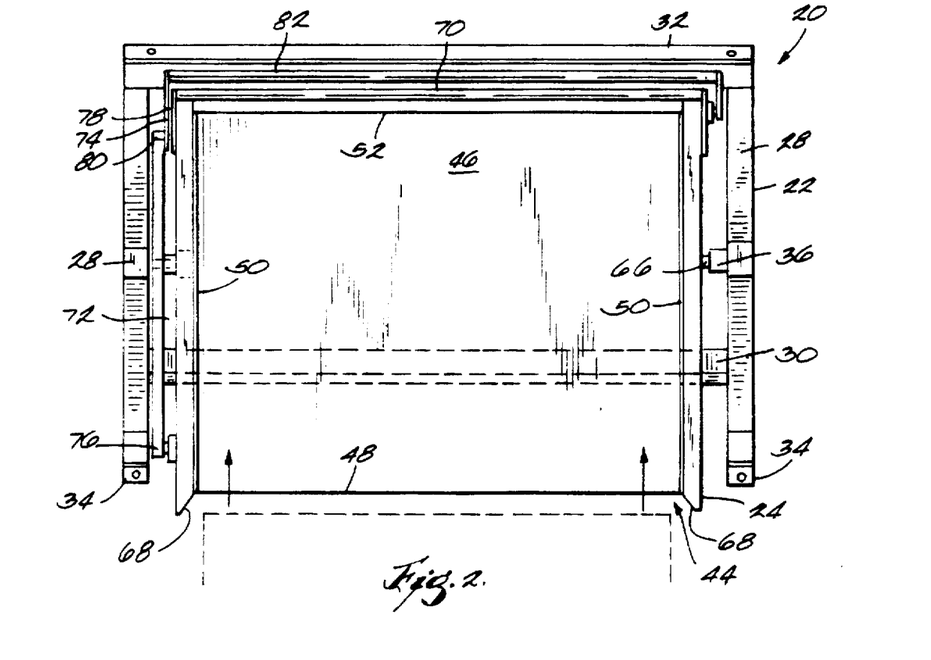
FIG. 2 is a top plan view of the tilt carriage illustrated in FIG. 1.
Figure 3:
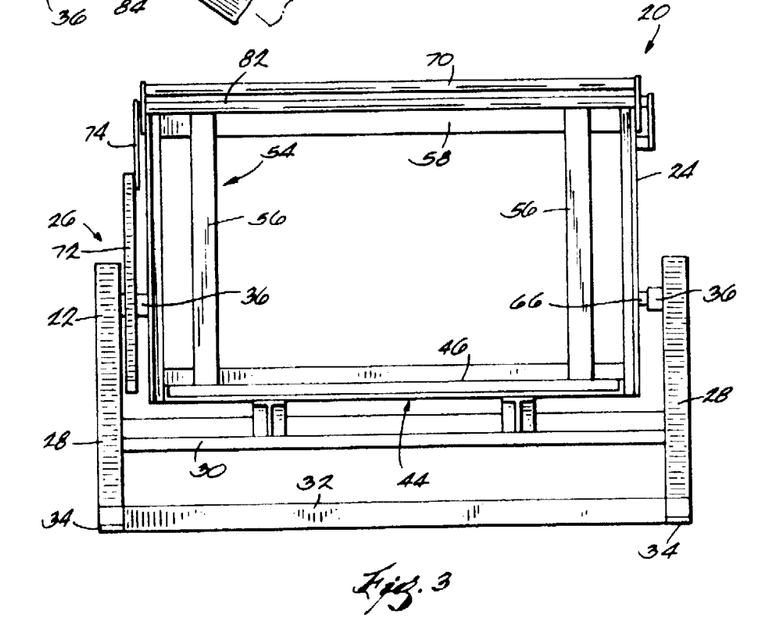
FIG. 3 is a front elevation view of the tilt carriage illustrated in FIG. 1.
Figure 4:
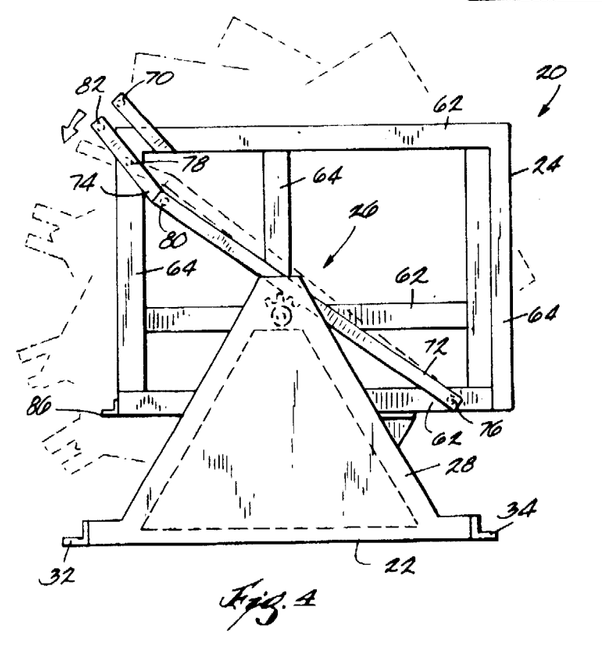
FIG. 4 is a side elevation view of the tilt carriage illustrated in FIG. 1 with phantom lines illustrating the carriage in several tilted positions.

Each side tubular structure 60 further includes a pivot shaft 66 extending inwardly from an inner surface, as illustrated in FIGS. 2 and 3. The pivot shafts 66 are dimensioned to fit within the bearing housings 36 with a suitable rotational bearing (not shown) positioned therebetween.

In accordance with one aspect of the present invention, the inner front edge of each of the side tubular structures 60 includes a beveled edge 68 (FIG. 2). This beveled edge facilitates loading containers onto the platform 44 by providing a lead-in for guiding the container onto the platform 44.

The carriage 24 further includes a tilt handle 70 positioned near an upper portion of the back tubular structure 54. The tilt handle 70 facilitates manual tilting of the carriage.

The manual locking mechanism 26 is operatively positioned between the carriage 24 and the base frame 22. In the illustrated embodiment, the manual locking mechanism 26

4 includes a lock bar 72 and a lock control member 74. One end 76 of the lock bar 72 is pivotally secured to the carriage 24, and an intermediate point 78 of the lock control member 74 is pivotally secured to the carriage 24. The lock bar 72 and lock control member 74 are interconnected by a slide-pivot interconnection 80. The lock control member 74 includes a lock handle 82 positioned adjacent the tilt handle 70. The lock handle 82 can be selectively pivoted about the intermediate point 78 to provide movement to the lock bar 72.

A finger member 84 (FIG. 5) extends laterally from a midpoint of the lock bar 72. The finger member 84 is designed to be selectively inserted into the recesses 42 of the lock retainer 38 to thereby selectively prevent relative tilting between the carriage 24 and the base frame 22. Movement of the finger member 84 relative to the lock retainer 38 can be accomplished by moving the lock handle 82. In the illustrated embodiment, movement of the lock handle 82 away from the tilt handle 70 and in the direction of tilting of the carriage 24 will cause the finger member 84 to be moved away from the lock retainer 38 and out of engagement with the corresponding recess 42. The carriage 24 can then be tilted to a desired location. Subsequent movement of the lock handle 82 toward the tilt handle 70 will cause the finger member 84 to be moved toward the lock retainer 38 and into a corresponding recess 42 to thereby lock the carriage 24 relative to the base frame 22. In the illustrated embodiment, the recesses 42 are positioned such that the carriage 24 can be locked at tilt angles of 0°, 30°, 60° and 80°.

The carriage assembly 20 further includes a step member in the form of a kick plate 86 extending laterally outwardly from the full width of the carriage 24. The kick plate 86 is designed to be engageable by a user's foot to facilitate tilting of the carriage 24. In the illustrated embodiment, the kick plate 86 is made from angle iron having a first leg secured to the carriage 24 and a second leg extending laterally outwardly from a lower portion of the carriage 24.

Figure 6:
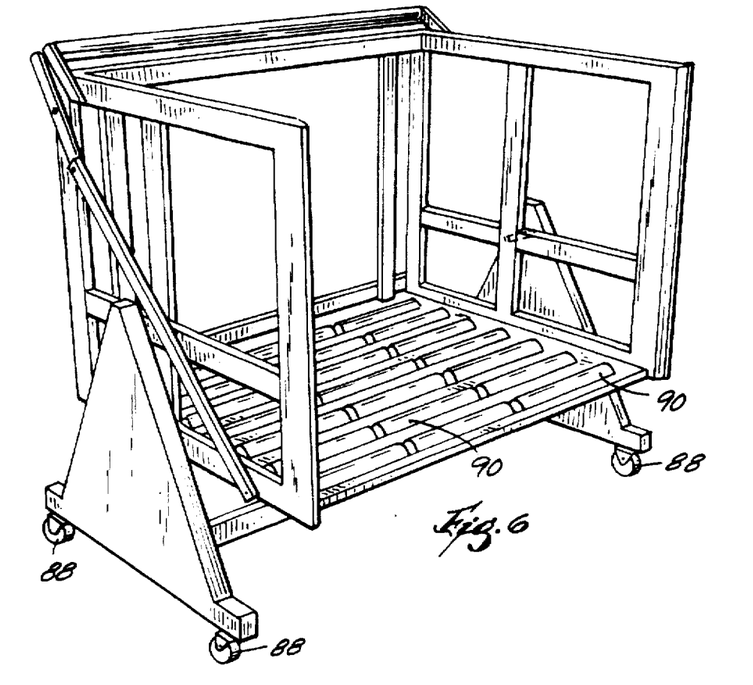
FIG. 6 is a perspective view of a tilt carriage depicting a second embodiment of the present invention.

A second embodiment of the present invention is illustrated in FIG. 6. In FIG. 6, the carriage assembly 20 includes a plurality of casters 88 secured to the support members 28. The casters 88 facilitate transport of the carriage assembly 20 from one location to another. The casters 88 can be selectively locked to secure the carriage assembly 20 in place during use.

The carriage assembly 20 of FIG. 6 also includes a conveyor device in the form of rollers 90 secured to and forming a part of the platform 44. The rollers 90 are designed to allow relative motion between a container and the platform 44 to thereby facilitate loading and unloading of the container. While the illustrated embodiment discloses a plurality of rollers 90, the conveyor device could comprise a conveyor belt or any other suitable means for facilitating motion of a container relative to the platform 44. FIGS. 7–11 illustrate a third embodiment of the present invention. Similar to the previously-described embodiments, the tilt carriage assembly 100 includes a base frame 102 and a carriage 104 pivotally supported by the base frame 102. The carriage 104 can be pivoted from a generally non-tilted position to a plurality of tilted positions. However, in contrast to the tilt handle, lock handle and lock bar utilized in the other embodiments, the assembly 100 of FIGS. 7–11 utilizes a rotary power transfer device 106 to provide tilting to the carriage. The power transfer device 106 also includes a means for locking the carriage 104 at a particular tilt position relative to the base frame 102.

Figure 7:
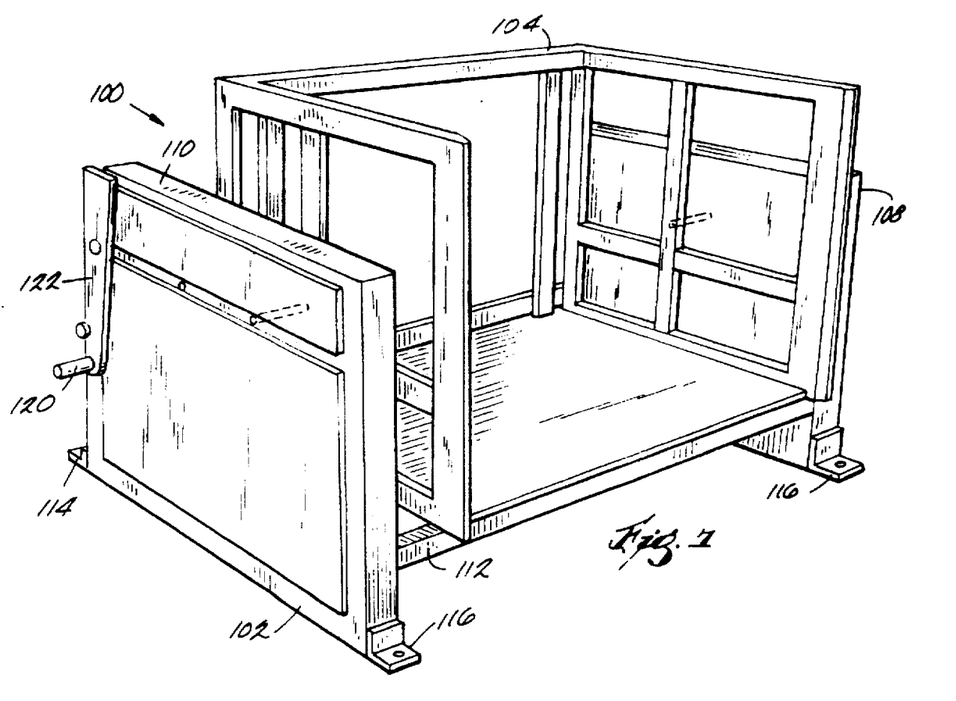
FIG. 7 is a perspective view of a tilt carriage depicting a third embodiment of the present invention.
Figure 8:
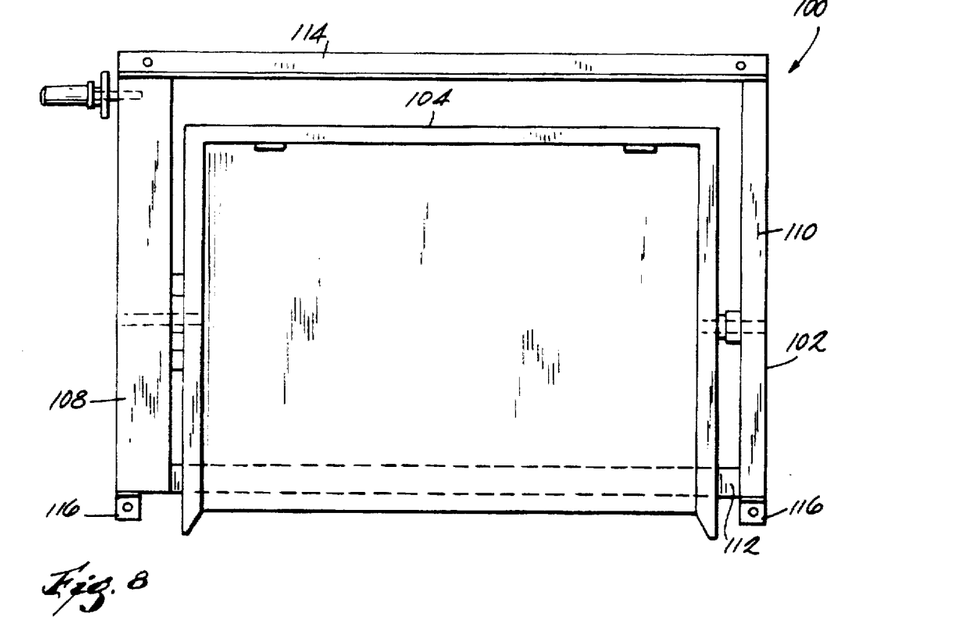
FIG. 8 is a top plan view of the tilt carriage illustrated in FIG. 7.
Figure 9:
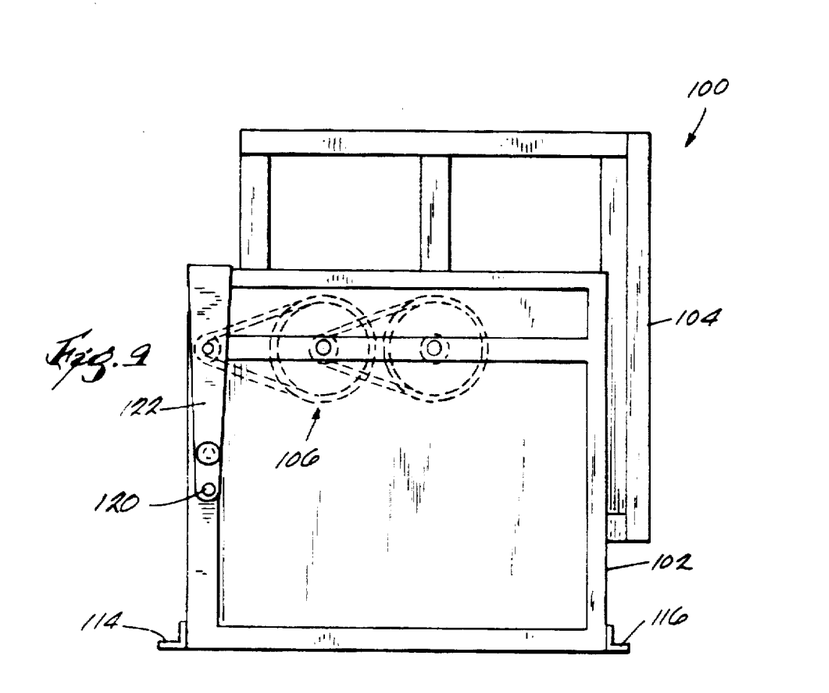
FIG. 9 is a side elevation view of the tilt carriage illustrated in FIG. 7.

The illustrated base frame 102 includes two substantially rectangularly-shaped support members 108, 110 interconnected by a support tube 112 and a rear base angle 114 (FIGS. 7–8). Two front base angles 116 provide a means for securing the base frame to the floor utilizing, for example, bolts or other appropriate fastening means. One of the support members 108 is hollow and substantially thicker than the other support member 110 to provide a cavity to house part of the power transfer device 106 therein.

The carriage 104 is substantially the same as the previously-described carriage. Further, the means for pivotally mounting the carriage 104 to the base frame 102 is essentially the same as that described above in the other embodiments.

Figure 10:
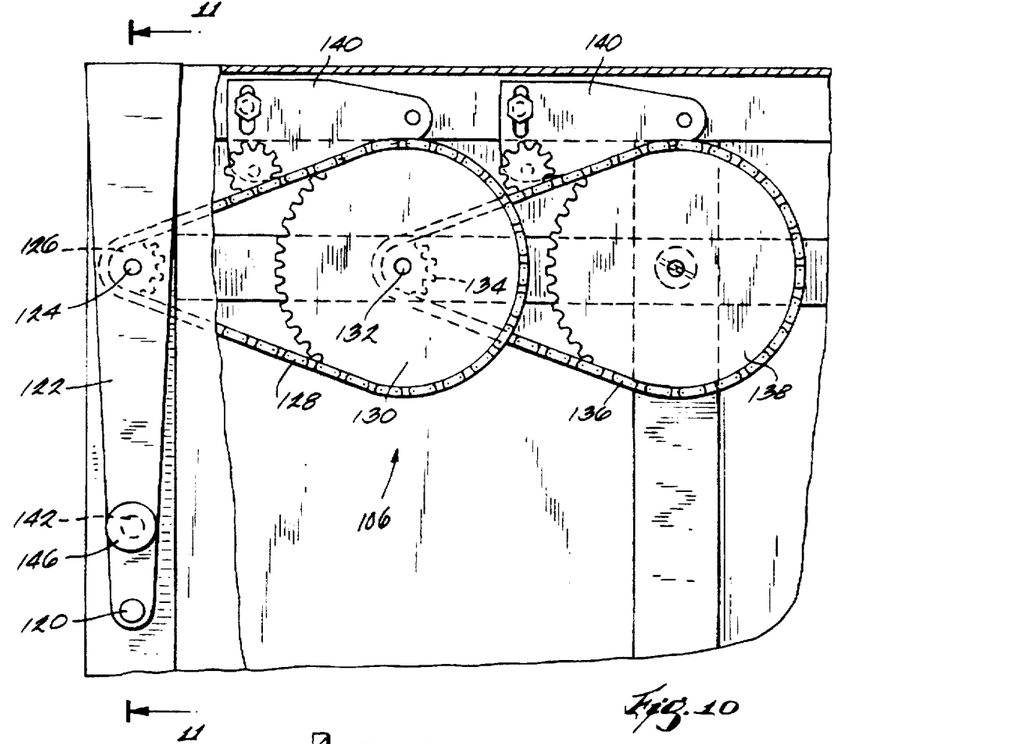
FIG. 10 is an enlarged partial section view of the drive mechanism illustrated in FIG. 9.
Figure 11:
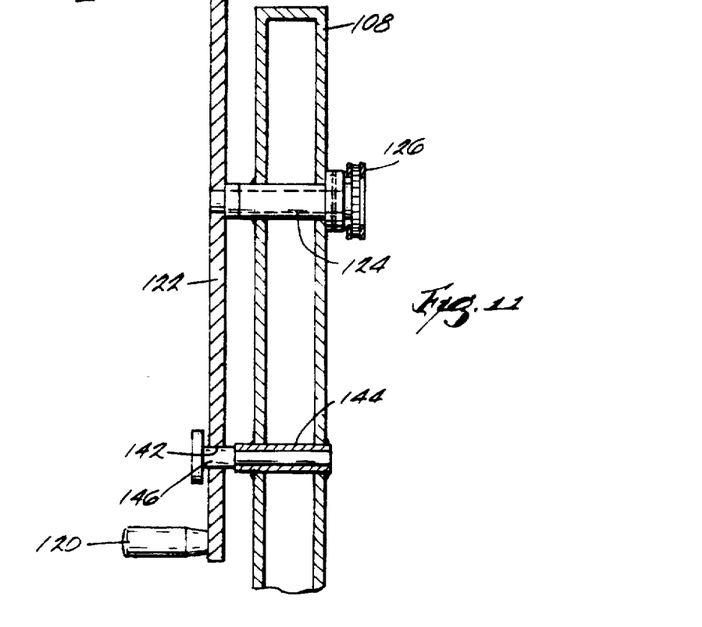
FIG. 11 is a section view taken along line 11—11 in FIG. 10.

The illustrated rotary power transfer device 106 includes a crank handle 120 and crank arm 122 that are operatively connected to the carriage 104 by gears and chains. Referring to FIGS. 10 and 11, the crank handle 120 is secured to the crank arm 122, and the crank arm 122 is rotationally mounted to the hollow support member 108 by a drive shaft 124 extending through the interior of the hollow support member 108. A drive gear 126 of small diameter is coupled to the drive shaft 124 and is positioned within the interior of the hollow support member 108. A first chain 128 interconnects the drive gear 126 to an intermediate large gear 130 secured to an intermediate shaft 132 that is rotationally mounted within the interior of the hollow support member 108. An intermediate small gear 134 is secured to the intermediate shaft 132 within the interior of the hollow support member 108. A second chain 136 interconnects the intermediate small gear 134 to a driven gear 138 secured to the carriage 104. In the illustrated embodiment, the drive gear 126 and intermediate small gear 134 each have twelve teeth, and the intermediate large gear 130 and driven gear 138 each include sixty teeth. Two idler mechanisms 140 are used to keep the chains 128, 136 under proper tension.

Utilizing this arrangement, the carriage 104 can be tilted by rotating the crank arm 122. Due to the chosen gear reduction, this arrangement provides significant mechanical advantage that facilitates relatively easy rotation of the crank arm 122 even when heavy loads are loaded in the carriage 104.

In order to lock the carriage 104 in a position relative to the base frame 102, there is provided a means for locking the crank arm 122 relative to the base frame 102. The locking means includes a lock orifice 142 extending through the crank arm 122, and a lock housing 144 secured to the hollow support member 108 in radial alignment with the lock orifice 142. A lock pin 146 can be inserted through the lock orifice 142 and into the lock housing 144 (FIG. 11) to secure the crank arm 122 relative to the base frame 102. Because of the drastic gear reduction, one full rotation (i.e., 360 degrees) of the crank arm 122 results in only four hundredths of a rotation (i.e., 14.4 degrees) of the carriage 104. Accordingly, the carriage 104 can be locked at 14.4 degree intervals.

Figure 12:
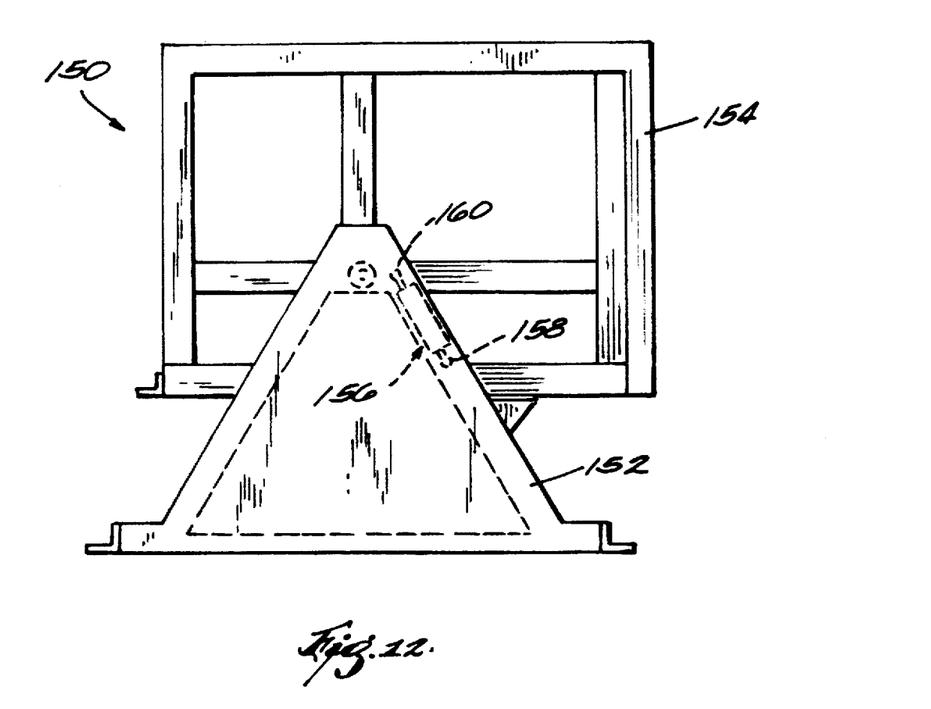
FIG. 12 is a side view of a fourth embodiment of the present invention

FIG. 12 illustrates a tilt carriage assembly 150 wherein the tilting is performed by an automatic actuator. The assembly 150 includes a base frame 152 and a carriage 154. In the illustrated embodiment, the automatic actuator includes a linear actuator in the form of a piston/cylinder arrangement 156 having the cylinder end 158 secured to the base frame 152 and the piston end 160 secured to the carriage 154. The arrangement 156 could be actuated by either pneumatic or hydraulic fluid. It should be appreciated that the automatic actuator could instead include a rotary actuator, such as an electric rotary actuator.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A tilt carriage assembly for use in supporting a container and for tilting the container between selected tilt positions, the tilt carriage assembly comprising:

a base frame;

a carriage pivotally supported by said base frame, said carriage including a bottom member adapted to support a container and a back member positioned above said bottom member, said back member being adapted to support a side of a container when said carriage is tilted; and a manual locking mechanism operatively positioned between said carriage and said base frame, said locking mechanism including a lock control member movably mounted to said back member, said lock control member being movable between a locked position where said carriage is secured relative to said base frame and an unlocked position.

2. A tilt carriage assembly as claimed in claim 1, wherein said lock control member includes a lock handle that moves down when the lock control member moves from the locked position to the unlocked position.

3. A tilt carriage assembly as claimed in claim 1, wherein said back member includes an upper portion, and wherein said lock control member is pivotally connected to said upper portion.

4. A tilt carriage assembly as claimed in claim 1, wherein said manual locking mechanism further includes a lock bar operatively connected to said lock control member and pivotally connected to said carriage.

5. A tilt carriage assembly as claimed in claim 4, wherein said locking mechanism includes a multi-position locking device operatively positioned between said lock bar and said carriage.

6. A tilt carriage assembly as claimed in claim 5, wherein said locking device includes:

at least one finger member connected to one of said lock bar and said carriage; and at least one recess connected to the other of said lock bar and said carriage, wherein said finger can selectively engage said recess.

7. A tilt carriage assembly for use in supporting a container and for tilting the container between selected tilt positions, the tilt carriage assembly comprising:

a base frame;

a carriage pivotally supported by said base frame, said carriage including a bottom member adapted to support a container and a back member positioned above said bottom member, said carriage being tiltable in a forward rotational direction from a generally non-tilted position to a tilted position, said back member being adapted to support a side of a container when said carriage is in the tilted position; and a manual locking mechanism operatively positioned between said carriage and said base frame, said locking mechanism being movable between a locked position where said carriage is secured relative to said base frame and an unlocked position, wherein said locking mechanism includes a lock handle that moves substantially in the forward rotational direction when said locking mechanism moves from the locked position to the unlocked position to thereby aid in providing forward rotation to the carriage.

8. A tilt carriage assembly as claimed in claim 7, wherein said carriage includes a tilt handle positioned adjacent said lock handle, and wherein said lock handle moves away from said tilt handle when the locking mechanism moves from the locked position to the unlocked position.

9. A tilt carriage assembly for use in supporting a container and for tilting the container between selected tilt positions, the tilt carriage assembly comprising:

a base frame;

a carriage pivotally supported by said base frame, said carriage including a bottom member adapted to support a container and a back member positioned above said bottom member, said back member being adapted to support a side of a container when said carriage is tilted; and a step member secured to and extending laterally outwardly from said carriage, said step member being engageable by a user's foot to facilitate tilting of said carriage.

10. A tilt carriage assembly as claimed in claim 9, wherein said carriage includes a lower portion, and wherein said step member extends laterally outwardly from said lower portion.

11. A tilt carriage assembly as claimed in claim 9, wherein said step member comprises a substantially L-shaped rail having first and second legs, said first leg being secured to said carriage and said second leg extending laterally outwardly from said carriage.

12. A tilt carriage assembly as claimed in claim 9, wherein said carriage is tiltable from a generally non-tilted position to a tilted position, and wherein said step member moves down as said carriage is tilted from the non-tilted position to the tilted position.

13. A tilt carriage assembly for use in supporting a container and for tilting the container between selected tilt positions, the tilt carriage assembly comprising:

a base frame; and a carriage pivotally supported by said base frame, said carriage including:

a bottom member adapted to support a container, said bottom member having a front portion, two side portions and a back portion;

a back member positioned above said back portion of said bottom member; and a side member positioned above at least one of said side portions of said bottom member, wherein said side member includes a beveled edge extending perpendicular to said bottom member and that facilitates loading a container onto said carriage.

14. A tilt carriage assembly as claimed in claim 13, wherein said carriage includes a second side member positioned above the other side portion, and wherein the second side member includes a beveled edge.

15. A tilt carriage assembly as claimed in claim 14, wherein said beveled edges are formed on an inner front edge of said side portions.

16. A tilt carriage assembly as claimed in claim 14, further comprising an automatic actuator operatively positioned between said base frame and said carriage.

17. A tilt carriage assembly for use in supporting a container and for tilting the container between selected tilt positions, the tilt carriage assembly comprising:

a base frame;

a carriage pivotally supported by said base frame, said carriage including a bottom member, adapted to support a container, side members, and a back member, the side members and back member being positioned above said bottom member, said back member being adapted to support a side of a container and inhibit sliding movement of the container when said carriage is tilted; and a conveyor device secured to said bottom member for facilitating motion of a container relative to said bottom member.

18. A tilt carriage assembly as claimed in claim 17, wherein said conveyor device includes a plurality of rollers.

19. A tilt carriage assembly as claimed in claim 17, further comprising an automatic actuator operatively positioned between said base frame and said carriage.

* * * * *